United States Patent Office 3,685,996
Patented Aug. 22, 1972

3,685,996

THERMOGRAPHIC COPY SHEET CONTAINING A BENZO HYDRAZONE

Albert W. Leclair, Hudson, and Charles H. Benbrook, Nashua, N.H., assignors to Nashua Corporation, Nashua, N.H.

No Dawing. Filed Apr. 2, 1970, Ser. No. 25,260
Int. Cl. G03c *1/36, 1/02*
U.S. Cl. 96—101 1 Claim

ABSTRACT OF THE DISCLOSURE

The presence of a benzo hydrazone compound in a reducible silver salt-based thermo copy sheet improves the density and contrast of the image areas.

This invention relates to thermographic copying and provides thermographic copy sheets having a hydrazone auxiliary reducing agent.

In thermographic copying, heat energy, generally from an infrared source, is utilized to bring about a color-forming reaction in the copy sheet. In one type, the heat sensitive sheet is brought into face to face contact with a graphic original which carries an image formed of heat absorbing material. When these are exposed to infrared radiation, the image portion of the original is selectively heated to cause the development in the adjacent sheet of a color pattern corresponding to the original. In another type, one of the color forming components of the copy sheet is destroyed or otherwise rendered inactive by exposure to short wave length radiation in the portions corresponding to the white, non-image areas, thereafter the application of heat or infrared radiation causes color formation in the image areas. This latter type of system has the advantage that the final copy does not remain heat sensitive, as the reactivity of the system has been destroyed by the short wave length radiation. It is primarily to this type of system that the present invention is directed.

The system of this invention may utilize a single sheet having a coating containing reactive components, one of which is rendered inactive by exposure to short wave length radiation. Known systems of this type are described by Lawton and Lopez, U.S. Pat. No. 3,076,707 and by Grant, U.S. Pat. No. 3,094,619 which utilize color-forming systems employing diazonium compounds and alpha naphthols respectively. In these systems the copy sheet may be exposed to a short wave length, e.g. ultraviolet radiation image of the original to be copied, to inactivate all but the unexposed black areas of the copy sheet, and then heated to develop color in the black areas where the components remain reactive. Alternatively, the copy sheet may be initially exposed to infrared radiation while being in contact with the graphic original, to bring about a color-forming reaction in the areas in contact with the black parts of the original, and then subsequently exposed to short wave length radiation to inactivate the unreacted parts of the sheet.

Two-sheet systems are also known, as exemplified by Benbrook, U.S. Pat. No. 2,789,904 and Workman, U.S. Pat. No. 3,094,417, in which the reactant susceptible of being deactivated by exposure to short wave length radiation is carried on a sheet separate from the sheet which carries the material with which it enters into a color forming reaction. In utilizing the two-sheet system, the sheet containing the deactivatable component is first exposed to a short wave radiation image of the original to be copied to cause deactivation of the exposed portions. This sheet is then brought into contact with a sheet containing the other color-forming components and heated to bring about a color forming reaction in the unexposed areas. The two-sheet system requires that one of the color forming reactants will transfer when heated from one sheet to the other sufficiently to bring about the color forming reaction.

The present invention is based on the discovery that the presence of certain benzo-hydrazone compounds provides images of increased color density in thermographic systems employing as the color forming reactants a metal salt such as a silver soap and a material which may be rendered thermographically inactive by exposure to short wave length radiation. This invention accordingly provides systems in addition to those previously known for providing permanent heat insensitive copies by thermographic means.

The benzo hydrazone compound is believed to act as an auxiliary reducing agent which has the caracteristic of remaining active after exposure to either ultraviolet radiation or actinic light. Low concentrations of the auxiliary reducing agent are employed so that it will reduce the meal salt under normally employed reaction temperature only in the presence of the photosensitive reducing agent. The images obtained when an auxiliary reducing agent is used has greatly improved color density as compared to images obtained without toner.

In general, the system of this invention utilizes a benzo hydrazone, a metal salt and a reagent which enters into a color forming reaction with the metal salt. Suitable reagents are those which are rendered thermographically inactive by exposure to short wave length radiation such as the naphthols disclosed by U.S. Pat. No. 3,094,417 to Workman such as 4-methoxy-1-naphthol, the pyrazolones disclosed in copending applications Ser. No. 805,840 filed Mar. 10, 1969 such as 3-methyl-1-(p-tolyl)-2-pyrazolin-5-one, the aceto-acetonitrates disclosed in copending application Ser. No. 805,839 filed Mar. 10, 1969 such as 2-(p-chlorophenyl)aceto-acetonitrile or any other compounds which react to form a colored product with a metal salt, particularly a silver salt. Suitable reactive silver salts are disclosed for example in U.S. Pat. No. 3,094,417, these being generally the normally solid organic salts of silver. The benzo-hydrazone can be combined with the metal salt and the thermographically desensitizable compound in a suitable binder and applied to a backing sheet of paper or the like to form a one sheet system. In two sheet systems it is preferably combined with the silver salt, but may alternatively be added to the sheet containing the inactivatable reagent, as it will migrate during image development to the image sheet.

The compound reactive with the metal salt can be desensitized by exposure to ultraviolet radiation, but may be rendered sensitive to actinic radiation of longer wave length, for instance that from a tungsten filament lamp, by introducing a dye sensitizer in accordance with well known photochemical technology. Dye sensitizers such as erythrosin have been found to be quite suitable, but others may be used. Typical examples of thermographic copy systems of this invention are described in the following example:

EXAMPLE I

A sheet useful for instance with a short wave length sensitive sheet such as described in copending application Ser. No. 803,840 consists of a bond weight white paper base coated with an ethyl acetate solution of the benzo hydrazone to a coated weight of 6.0 lbs. per 3,000 square feet. A suitable coating composition consists of:

| | Parts by weight |
|---|---|
| Ethylacetate | 38.30 |
| Polyvinyl butyral (Butvar B-79) | 3.00 |
| Silver stearate | 1.51 |
| Zinc oxide | 5.98 |
| Stearic acid | 0.16 |
| Benzaldehyde phenyl hydrazone | 0.06 |

applied by a Mayer Rod and coated and dried.

This sheet was heated in contact with a 3M Dual Spectrum Pink Sheet as described by Workman, U.S. Pat. No. 3,094,417, previously exposed as described therein. The resultant image obtained on the white sheet in accordance with this example had a greatly improved color density as compared to a sheet formed and exposed in the manner described but not containing the hydrazone.

Other hydrazones which have been found useful are:

Benzaldehyde phenyl hydrazone
Benzophenone phenyl hydrazone
Benzaldehyde methyl phenyl hydrazone
Benzaldehyde methyl hydrazone 2-naphthylaldehyde phenyl hydrazone
P-chlorobenzaldehyde phenyl hydrazone Having thus disclosed my invention and described in detail preferred embodiments thereof, I claim and desire to secure by Letters Patent:

1. In a copy sheet product which includes a reducible normally solid silver soap that is reactive with a light desensitizible reducing agent such as 4-methoxy-1-naphthol to produce a colored image, the improvement comprising benzo hydrazone in reactive association with the said silver soap in a small but effective amount sufficient to enhance the density of the image.

References Cited

UNITED STATES PATENTS 3,499,902 3/1970 Coles et al. ---------- 117—36.8

NORMAN G. TORCHIN, Primary Examiner
R. E. FICHTER, Assistant Examiner

U.S. Cl. X.R.

96—114.1; 117—36.2, 36.8, 36.9; 250—65.1